United States Patent Office 2,804,593
Patented Aug. 27, 1957

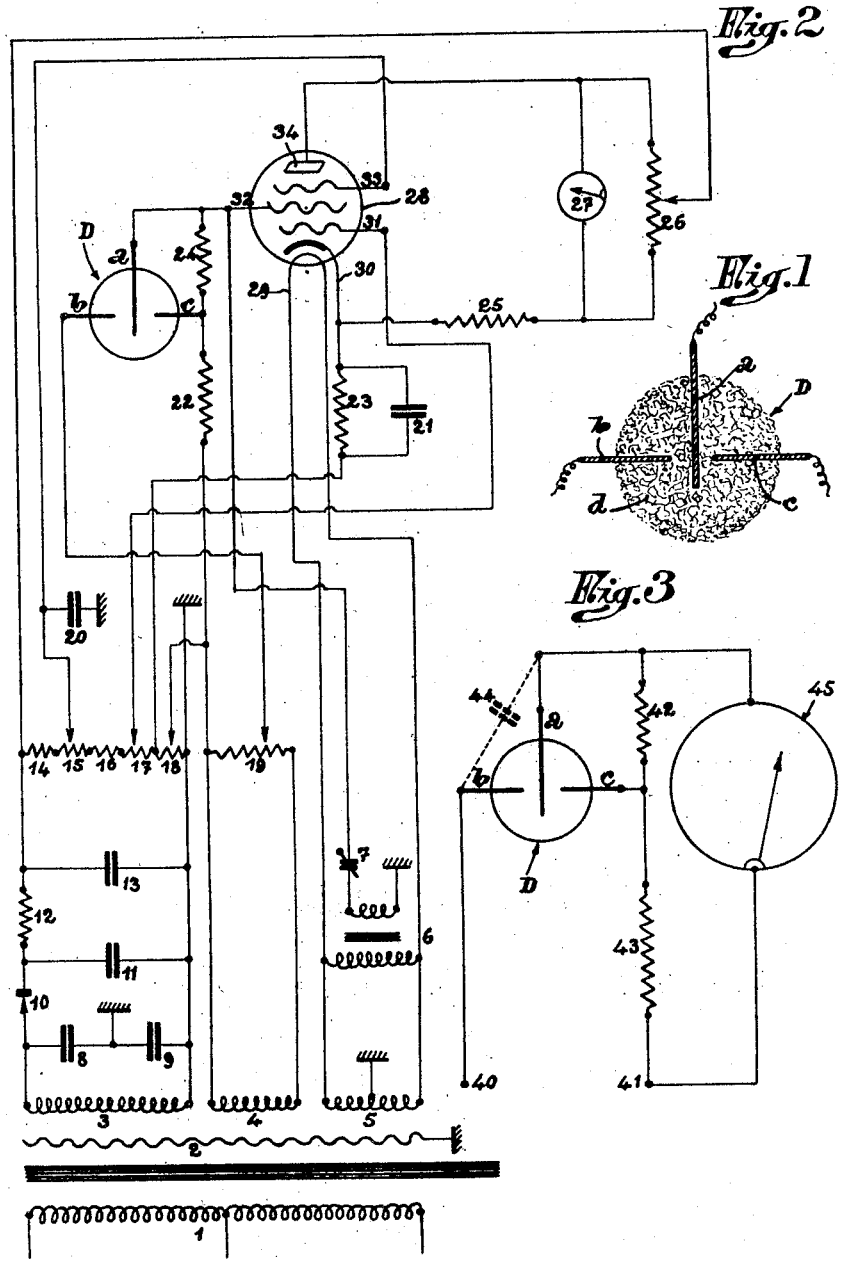

2,804,593

APPARATUS FOR DETERMINING THE RELATIVE, SPECIFIC, OR ABSOLUTE HUMIDITY IN THE ATMOSPHERE

Henri Eicken, known as Estienne, Lyon, France

Application October 20, 1953, Serial No. 387,285

Claims priority, application France May 13, 1953

10 Claims. (Cl. 324—65)

The air humidity corresponds to the quantity of water vapour in the atmosphere. Humid air therefore consists of a mixture of two gases—water vapour and dry air—which varies according to temperature and air pressure. Contrary to other gases, which mix readily in all proportions vapour and dry air cannot be so mixed; dry air can absorb only a certain quantity of water vapour at a certain temperature.

Therefore the temperature and air pressure must be considered when it is necessary to know the quantity of water contained in the gaseous form in a certain quantity of air.

In the present state of the art, industry does not yet possess any instrument by which it is possible to measure simultaneously: (a) the relative air humidity, (b) the specific air humidity, (c) the absolute air humidity, at temperatures from absolute zero up to +300° C., which are used for drying or thermal machines, without any calculation or constant readjustment and with a delay of only a few seconds, and without any correction of the atmospheric pressure or the altering temperature.

This need is fully provided for by the instrument which forms the object of the present invention.

This mainly includes: (a) the measuring element proper which allows the measurement of accurate humidity at any temperature between absolute zero and about +300° C., with a tolerance of ±0.01 percent, (b) the electrical connections of the instrument which give a visual indication, quite automatically and without any adjustment, of the values obtained by the measuring element and relating to (a) the relative, (b) the specific, (c) the absolute air humidity.

The present invention will now be described with reference to the attached schematic drawing in which:

Fig. 1 represents the measuring element.

Fig. 2 one of the suggested circuits for the construction of a new meter which will offer special advantages, using partly known connections which are determined by its application.

Fig. 3 another circuit which offers very great possibilities.

The measuring element according to the invention, as shown in Fig. 1, is composed of one cell comprising 3 electrodes $a$ $b$ $c$ embedded in quartz grains of a determined size. Under a certain temperature and pressure, these quartz grains are so sintered that they form a porous cell enclosing the above mentioned electrodes. Besides quartz, other materials may also be used, on the condition that they possess a dielectric constant which hardly alters at temperatures from the absolute zero to +300° C. These materials should also have the same characteristics with regard to their electric resistance.

The grains of quartz or any other material used for the construction of the cell are chosen so that the cell, when it is finished, may easily be saturated with even motionless air, owing to its porous character, and therefore also with the humidity contained in the air; in other words, the conditions within the cell shall be always the same as those outside.

The cell is equipped with 3 electrodes $a$ $b$ $c$ to ensure that, from the technical point of view, it not only works as a double cell, or as two single cells, but also automatically equalises and eliminates all differences which would otherwise inevitably appear if the electrodes are not accurately positioned, which, in practice, can not be done.

This kind of assembly however enables all cells to have the same characteristics.

If the electrodes are of the correct shape and are in the described position, the lines of force starting from electrode $a$ are always intersected, in a rigorously similar way, by the lines of force starting from electrodes $b$ and $c$. It is of no importance, therefore, if the positions of the electrodes in different cells vary somewhat, in spite of all precautions taken during manufacture. In effect, the path of the measuring current is always automatically the same for all cells. As from the chemical point of view, the construction of the cells may be the same for all cells, apart from some very small differences which do not influence the measurements, by using the same grains, the very same materials, the same temperature and pressure, the measuring elements and consequently the results are always exactly the same.

The D. C. resistance of these cells varies or ranges from 5 megohms at 99% relative air humidity to about 5 million megohms at 5% relative air humidity. As in manufacture it is impossible to obtain the exact cell capacity of some 100 $\mu$F, in order to eliminate the instrument capacity which may easily be kept below 10 $\mu$F, it is easier to reduce the capacity of the cells to a minimum and compensate the instrument capacities in a suitable way.

The circuit of the instrument which is shown in Fig. 2 consists of a transformer with a primary winding 1, earthed screen 2, secondary windings 3 and 4, for the high tensions, secondary winding 5 for the heater voltage. In parallel with winding 5 is transformer 6 and condenser 7 which cancel out standing A. C. ripple by phase shift which may affect the grid on which the measurements are made.

Besides the components 1 to 7, condensers 8, 9, 11, 13, 20, rectifier 10, resistances 12, 14, 16, potentiometers 15, 17, 18, 19 represent the power supply of the instrument.

The measuring part of the instrument is composed of condenser 21, resistances 22, 23, 24, 25, potentiometer 26, milliammeter 27, tube 28 with heater 29, cathode 30, control grid 31, screen and suppressor grids 32 and 33 and anode 34, measuring cell D with electrodes $a$, $b$, and $c$; resistance 23 with condenser 21 connected parallel is to stabilize the anode current by feedback.

The measuring voltage, taken from the slider of potentiometer 19 is applied to resistance 24 by the current path of electrodes $b$ and $a$ and the return path via resistance 22. Hence, the cell D and resistances 22 and 24 constitute a voltage divider.

The variations of cell impedances produced by the humidity of air and the resultant voltage variations are applied to grid 32. As the measuring gaps $b$—$a$ and $a$—$c$ are equally influenced by the air humidity but the applied voltages are in phase opposition, the potential differences on grid 32 would ordinarily remain unaltered, despite small mechanical differences in the construction of the cell, but the resistance 24 is connected parallel to the current path $c$—$a$ and resistance 22 is connected in series. When resistances 24 and 22 are chosen correctly, the sensitivity of the measuring cell can be influenced at will for determined ranges of humidities and the meter scale can be made to comply with practical requirements.

It is also possible to reduce or increase the sensitivity of the meter by increasing or reducing the value of resistance 24.

Fig. 3 shows another form of construction which can be very easily carried out with the new cell D. The device consists of the above described measuring cell D, two or more resistances 42 and 43, one optional condenser 44 and one electro-static voltmeter 45.

An alternating current of 300 volts for instance, in applied to points 40 and 41. As described above for the embodiment of Fig. 2, it is possible also in the embodiment of Fig. 3 to influence the sensitivity of instrument 45 as well as the measuring curve by properly selecting the values of resistances 42 and 43 and condenser 44.

It is obvious that if direct current, instead of alternating current, is applied to points 40 and 41, the condenser 44, shown in broken lines for this reason, is omitted from the circuit of Fig. 3.

Besides the advantage of being very simple, this device offers the possibility of building very highly accurate and extremely strong instrument, as it excludes all parts subject to wear.

As the measuring cell itself is quite independent of the barometric pressure and the device for the measurement of temperature is capable of giving a very accurate reading in the simplest possible way, absolutely accurate measurements can be obtained in all cases.

As it can be easily understood from the preceding data, the invention is not at all limited to the above two explained circuits, but, on the contrary, includes all other possibilities.

What I claim is:

1. A humidity-responsive cell comprising a body of cohesive, porous, insulating material having substantially uniform values of dielectric constant and electrical resistance within the range of temperatures from zero absolute to about 300° C., and three electrodes embedded in said body substantially in a common plane, two of said electrodes extending inwardly from opposite sides of said body in substantial alignment and said third electrode extending at right angles thereto and intersecting the common axis of said two electrodes, whereby the lines of force of electrical field established around said third electrode, with said electrodes energized, intersect the lines of force of electrical field established around said two electrodes irrespective of slight inaccuracies in the positioning of said electrodes in said body.

2. A cell as claimed in claim 1 in combination with a circuit connected to said electrodes and including utilization means responsive to the current flowing in said circuit in terms of the radial extent of said lines of force as determined by the atmospheric humidity in and around said cell.

3. A device for determining the specific, relative and absolute humidity in the atmosphere comprising means including first, second and third electrodes exposed to the ambient atmosphere, circuit means including resistances for impressing on said first and second electrodes a first voltage and on said second and third electrodes a second voltage both susceptible of varying automatically in response to variations in the impedance of the atmosphere, said second voltage being a predetermined function of said first voltage, and utilization means responsive to variations in the relationship between said two voltages.

4. A device for determining the specific, relative and absolute humidity in the atmosphere comprising means including first, second and third electrodes exposed to the ambient atmosphere, circuit means for energizing a first and a second current path extending through said first-named means and defined, respectively, between said first and second and between said second and third electrodes; each of said paths including an atmospheric gap, thereby to establish at least three electric fields the lines of force of one of which intersect the lines of force of the other two, resistances included in said circuit means establishing different predetermined electrical parameters for said paths relatively to each other, and means responsive to relative variations of said parameters due to variations of the impedance of said gaps in terms of the radial dispersion of said fields.

5. A humidity-responsive cell comprising a body of sintered insulating material having substantially uniform values of dielectric constant and electrical resistance within the range of temperatures from zero absolute to about 300° C., the grain size and degree of sintering of said material being such as to constitute a cohesive porous body readily saturated in the ambient atmosphere thereby to permit a uniform internal and external humidity level, and three electrodes embedded in said body substantially in a common plane, two of said electrodes extending inwardly from opposite sides of said body in substantial alignment and said third electrode extending at right angles thereto and intersecting the common axis of said two electrodes, whereby the lines of force of electrical field established around said third electrode, with said electrodes energized, intersect the lines of force of electrical field established around said two electrodes irrespective of slight inaccuracies in the positioning of said electrodes in said body.

6. A humidity-responsive cell comprising a body of cohesive, porous, insulating material having substantially uniform values of dielectric constant and electrical resistance within the range of temperatures from zero absolute to about 300° C., and three mutually spaced rod-shaped electrodes embedded in said body substantially in a common plane and defining therebetween two atmospheric gaps, the positional relationship of said electrodes to each other in said body being such that the lines of force of electrical field established around one of said electrodes, with said electrodes energized, intersect the lines of force of electrical fields established around the other two of said electrodes.

7. A humidity-responsive cell comprising a body of sintered insulating material having substantially uniform values of dielectric constant and electrical resistance within the range of temperatures from zero absolute to about 300° C., the grain size and degree of sintering of said material being such as to constitute a cohesive porous body readily saturated in the ambient atmosphere thereby to permit a uniform internal and external humidity level, and three mutually spaced rod-shaped electrodes embedded in said body substantially in a common plane and defining therebetween two atmospheric gaps with one electrode positioned between the other two, the positional relationship of said electrodes to each other in said body being such that the lines of force of electrical field established around one of said electrodes, with said electrodes energized, intersect the lines of force of electrical fields established around the other two of said electrodes.

8. In a device for determining the amount of humidity in the atmosphere, in combination, a voltage divider comprising a humidity responsive cell exposed to the atmosphere, two series-connected impedances having a common terminal connected to a first electrode of said cell and one end terminal connected to a second electrode of said cell, a pair of input terminals connected respectively to the other end terminal of said series-connected impedances and to a third electrode of said cell, and a measuring device connected to said one end terminal and to one of said input terminals.

9. A device as in claim 8 adapted for the application of alternating current to said input terminals, said measuring device being connected in parallel with said series-connected impedances, and a capacitor connected across said second and third electrodes.

10. A device as in claim 8 wherein said measuring device comprises an electron discharge tube having at least a cathode connected to said one input terminal, a control grid connected to said one end terminal and an anode, and an indicating meter connected to said cathode and anode.

References Cited in the file of this patent

UNITED STATES PATENTS

| | | |
|---|---|---|
| 2,285,421 | Dunmore | June 9, 1942 |
| 2,589,557 | Lamb | Mar. 18, 1952 |
| 2,633,024 | Lamb | Mar. 31, 1953 |

FOREIGN PATENTS

| | | |
|---|---|---|
| 1,004,617 | France | Nov. 28, 1951 |